(12) United States Patent
Burgin

(10) Patent No.: US 7,037,479 B2
(45) Date of Patent: May 2, 2006

(54) METHOD FOR CLEANING NANOMORPHIC CARBON SPECIES

(75) Inventor: Timothy P. Burgin, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 608 days.

(21) Appl. No.: 10/247,007

(22) Filed: Sep. 19, 2002

(65) Prior Publication Data

US 2004/0057895 A1    Mar. 25, 2004

(51) Int. Cl.
*D01F 9/12* (2006.01)
(52) U.S. Cl. .................... 423/447.1; 209/1; 423/461
(58) Field of Classification Search ............. 423/447.1, 423/460, 461; 209/1; 977/DIG. 1
See application file for complete search history.

(56) References Cited

OTHER PUBLICATIONS

Bandow, S. ET AL., "Purification and magnetic properties of carbon nanotubes," Applied Physics A, 1998, pp. 23-27, vol. 67.
Bonard, J. ET Al., "Purification and size selection of carbon nanotubes," Advanced Materials, 1997,pp. 827-831, vol. 9, No. 10.
O'Connell M. ET AL., "Band gap fluroescence from individual single-walled carbon nanotubes," Science, Jul. 26, 2002, pp. 593-596, vol. 297.
Tarasov, B. ET Al., "Synthesis of carbon nanostructures by arc evaporation of graphite rods with Co-Ni and Yni2 catalysts," Carbon, 2003, pp. 1357-1364, vol. 41.
Thien-Nga L.ET AL., "Mechanical purification of single-walled carbon nanotube bundles from catalytic particles," Nano Letters, 2002, pp. 1349-1352, vol. 2, No. 12.
Duesberg, G.S. ET AL., "Towards processing of carbon nanotubes for technical applications," Applied Physics A, 1999, pp. 269-274, vol. 69.

*Primary Examiner*—Stuart Hendrickson

(57) ABSTRACT

An exemplary method for substantially non-chemically-reactive separation of nanomorphic carbon species (140) comprises inter alia the steps of suspending a nanomorphic carbon sample (100) in an aqueous surfactant suspension (110), adding nanoparticles to the sample suspension (115), sonicating the sample (120), centrifugating the sample suspension (125) and decanting off the resulting supernatant (130). Disclosed features and specifications may be variously controlled, adapted or otherwise optionally modified to improve carbon nanospecies purification. An exemplary embodiment of the present invention representatively provides for non-oxidative cleaning of carbon nanotubes via at least partial removal of amorphous carbon contaminants.

19 Claims, 1 Drawing Sheet

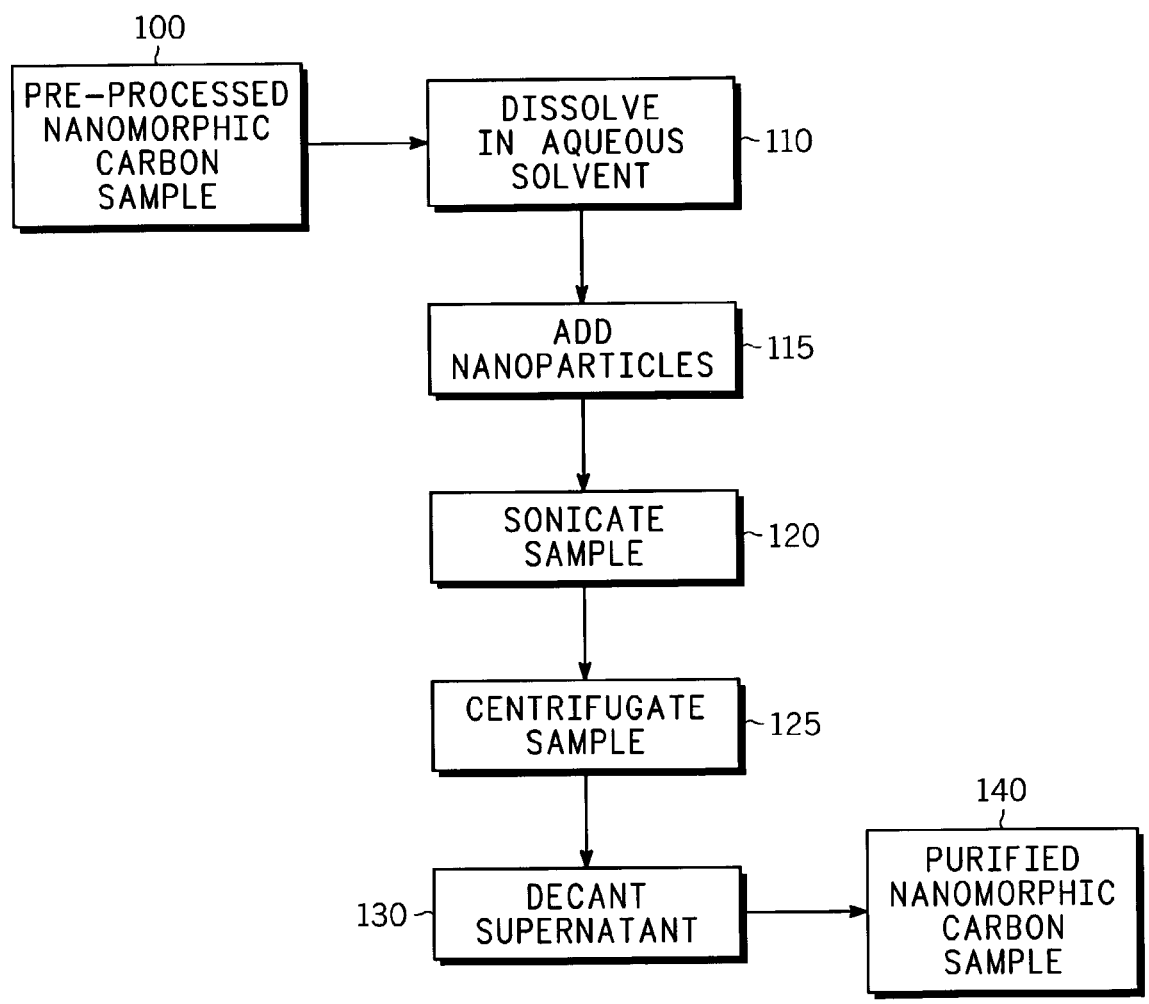

METHOD FOR CLEANING NANOMORPHIC CARBON SPECIES

RELATED APPLICATIONS

The present application is related to U.S. patent application Ser. No. 10/174,299 filed Jun. 18, 2002.

FIELD OF INVENTION

The present invention generally relates to methods for the cleaning of carbon nanomorphs. More particularly, the present invention involves non-oxidative methods for the purification of carbon nanotubes (CNT's) and nanofibers.

BACKGROUND

Since the 1970's, graphitic nanotubes and fibrils have been identified as materials of interest for a variety of applications. Sub-micron graphite fibrils are sometimes called vapor grown carbon fibers (e.g., nanofibers). Carbon fibrils generally comprise vermiculitic carbon deposits having diameters on the order of about less than 1.0 μm and have typically been prepared through catalytic decomposition of various carbonasceous gases on, for example, metal surfaces. Such vermiculitic carbon deposits have generally been observed since the advent of electron microscopy. See, for example, Baker and Harris, "Chemistry and Physics of Carbon", 14, 1978; and N. Rodriguez, *J. Material Research*, 8, 1993.

In 1976, Endo et al. proposed a basic mechanism by which carbon fibrils are thought to grow. See, A. Obelin and M. J. Endo, "Of Crystal Growth", 32, 1976. Carbon fibrils were generally first observed to originate from metal catalyst particles which in the presence of a hydrocarbon gas became supersaturated with carbon. A cylindrically-ordered graphitic core was extruded and subsequently coated with an outer layer of pyrolytically deposited graphite. These fibrils typically demonstrated diameters on the order of 0.1 μm, and more typically between 0.2 to 0.5 μm.

In 1983, Tennent succeeded in growing cylindrically-ordered graphite cores generally uncontaminated with pyrolytic carbon. See, for example, U.S. Pat. No. 4,663,230. Accordingly, Tennent generally provided access to smaller diameter fibrils, typically on the order of 35 to 700 Å (e.g., 0.0035 to 0.070 μm), as well as an ordered "as-grown" graphitic surface. Fibrillar carbon species of somewhat irregular structure, but without pyrolytic carbon, have also been generally observed.

Carbon fibrils, 'buckytubes' (e.g., CNT's) and nanofibers are generally distinct from continuous carbon fibers otherwise commercially available as, for example, reinforcement materials. In contrast to fibrils which usually have large yet generally finite aspect ratios, continuous carbon fibers typically demonstrate aspect ratios on the order of about $10^4$ and often as much as $10^6$ or more. The diameter of continuous carbon fibers is also generally substantially larger than that of fibrils; usually greater than about 1.0 μm and more typically between 5 to 7 μm. Carbon nanotubes of a morphology similar to catalytically grown fibrils have been demonstrated to grow in a relatively high temperature carbon arc. See, for example, Iijima, *Nature*, 354, 56, 1991. It is generally accepted that arc-grown nanofibers have morphology substantially similar to the earlier catalytically grown fibrils originally observed by Tennent. See, for example, Weaver, *Science*, 265, 1994.

Raw carbon nanotube and carbon nanofiber (CNF) reaction product typically contains numerous reaction byproducts and other contaminants, such as, for example: amorphous carbon; fullerenes; carbon polyhedra; and (in the case of single-wall CNT's) metal catalyst particles. Accordingly, many practical applications require purification in order to effectively reduce these contaminants prior to use of the nanomorphic carbon material. One such method involves a process for purifying carbon nanotubes by generally mixing CNT reaction product with a reagent selected from the group consisting of oxidation agents, nitration agents and sulfonation agents in liquid phase. See, for example, U.S. Pat. No. 5,698,175 to Hiura et al. The CNT's are then reacted at a predetermined temperature in liquid phase, wherein the carbon impurities may generally be selectively dissolved and then subsequently partitioned.

Other conventional chemical purification mechanisms generally involve reaction with an oxidative gas such as oxygen, steam or the like at relatively high temperature. For a general introduction and survey of various CNT and CNF purification methods in terms of their capacity, efficiency and effects on carbon nanomorphs, see for example, G. S. Duesberg et al., "Towards Processing of Carbon Nanotubes for Technical Applications", Appl. Phys., A, 69, 269, 1999.

Production methods for nanomorphic carbon species are now generally well established and typically allow for synthesis on a relatively large scale on the order of grams per day. For many potential applications of these materials, non-reactive purification still remains a largely unresolved problem. Accordingly, a representative deficiency of the prior art involves the cost-effective and efficient non-oxidative cleaning of, for example, CNT's and CNF's.

SUMMARY OF THE INVENTION

In various representative aspects, the present invention provides a system and method for substantially non-chemically-reactive purification of carbon nanomorphs. In one exemplary aspect, an aqueous suspension of pre-processed carbon nanotube reaction product is sonicated with an aqueous suspension of nanoparticles followed by centrifugation to precipitate the nanoparticles from the supernatant. The disclosed system and method may be readily adapted for purification and/or separation of any carbonaceous nano-species and in one representative aspect, the present invention may specifically embody a method for cleaning CNT's.

One representative advantage of the present invention would allow for the separation and purification of nanomorphic carbon species without requiring the need for chemical functionalization with the attendant production of reaction intermediates. Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the Claims.

BRIEF DESCRIPTION OF THE DRAWING

Representative elements, operational features, applications and/or advantages of the present invention reside inter a/ia in the details of construction and operation as more fully hereafter depicted, described and claimed—reference being had to the accompanying drawing forming a part hereof, wherein like numerals refer to like parts throughout. Other elements, operational features, applications and/or advantages will become apparent to skilled artisans in light of certain exemplary embodiments recited in the detailed description, wherein FIG. 1 illustrates a representative process method in accordance with one exemplary embodiment of the present invention.

DETAILED DESCRIPTION OF EXEMPLARY EMBODIMENTS

The following descriptions are of exemplary embodiments of the invention and the inventor's conception of the best mode and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

As used herein, the terms "cleaning", "separating", "partition", "purifying" and any variations thereof, may generally be used interchangeably and may be understood to generally comprise controlling or otherwise modifying the spatial and/or temporal distribution function of a first chemical species with respect to a second chemical species. Moreover, the terms "clean", "separate", "partition" and "purify", or any variation or combination thereof, are generally intended to include anything that may be regarded as at least being susceptible to characterization as, or generally referring to, the movement of at least one chemical compound from one area to another area so as to: (1) relatively decrease the concentration in or around one area, and/or (2) relatively increase the concentration in or around another area. In the case of the terms "cleaning" and/or "purifying", this process may generally be understood to comprise reduction of the concentration of contaminant compounds in or around the species being "cleaned" and/or "purified". Additionally, as used herein, the terms "carbon nanostructures", "carbon nanospecies", "carbon nanomorphs" and any variations thereof, may generally be understood to comprise, for example, at least one of: carbon nanotubes; carbon nanofibers; carbon nanopolyhedra and such other nanomorphic forms of carbon now known or hereafter derived or otherwise described in the art. As used herein, the terms "chromatography", and "chromatographic separation", and any contextual referents or variants thereof, are generally intended to include any method, technique, process, apparatus, device or system suitably adapted to separate or otherwise process at least one sample comprising at least one analyte in order to inter alia produce or otherwise condition the spatial and/or temporal distribution of any component analyte and/or combination of analyte components in said sample. Additionally, as used herein, the terms "spectroscopy" and "microscopy", and any variations thereof, are generally intended to include any method, technique, process, apparatus, device and/or system suitably adapted to read or otherwise process analyte-referent data in order to determine inter alia the presence and/or absence and/or concentration of any one analyte and/or any combination of analytes.

A detailed description of an exemplary application, namely a method for non-oxidative cleaning of CNT's, is provided as a specific enabling disclosure that may be generalized by skilled artisans to any application of the disclosed method for nanomorphic carbon purification and/or separation in accordance with various embodiments of the present invention. Moreover, skilled artisans will appreciate that the principles of the present invention may be employed to ascertain and/or realize any number of other benefits associated with carbon nanomorph purification such as, but not limited to: improvement of product yields; reduction of synthesis costs; improved process control and any other applications and/or benefits currently known or hereafter described in the art.

Chromatography

In general, the majority of chemical analysis techniques are at best selective; few, if any, are actually specific. Consequently, the separation of analyte(s) from heterogeneous multi-component samples is often an important step in many analytical procedures. The most widely used conventional means of performing analytical separations are electrophoresis and chromatography—both comprising methods that find application in nearly every scientific discipline.

Column chromatography was invented and named by the Russian botanist Mikhail Tswett shortly after the turn of the $20^{th}$ Century. Tswett employed the technique to separate various plant pigments (i.e., chlorophylls and xanthophylls) by passing solutions of samples through a glass column packed with finely divided calcium carbonate. The separated solutes appeared as colored bands on the column, which accounts for the name Tswett gave for the technique from the Greek chroma meaning "color" and graphein meaning "to write".

Various chromatographic technologies have appeared in the last five decades, due not only to the development of several new types of methods but also to the growing need by engineers and scientists for better means for characterizing complex mixtures. The significant impact of these technologies may be demonstrated by the 1952 Nobel Prize awarded to Martin and Synge for their discoveries in the field of chromatography. Perhaps even more impressive is twelve Nobel Prize awards between the years of 1937 and 1972 that were based upon work substantially relying on various chromatographic techniques.

In general, chromatography comprises a diverse and important group of methods that permit separation of analyte components of complex mixtures, where many of these separations may be impossible or otherwise prohibitively difficult by other means. Typically, a sample is dissolved in a mobile phase, which may be a gas, a liquid or a supercritical fluid. The mobile phase is then forced through an immiscible stationary phase, which is usually fixed in place in either a column or on a solid surface. The two phases may be chosen so that the components of the sample distribute themselves between the mobile and stationary phases to varying degrees. Those analyte components that are strongly retained by the stationary phase generally move slowly with respect to the flow of mobile phase. In contrast, analyte components that are weakly held by the stationary phase generally travel more rapidly. As a consequence of these differences in flow velocities (e.g., mobilities), analyte components typically separate into discrete bands that may be generally analyzed qualitatively and/or quantitatively. See, for example, E. Heftmann, *Chromatography: Fundamentals and Applications of Chromatography and Electrophotometric Methods*, 1983; P. Sewell and B. Clarke, *Chromatographic Separations*, 1988; J. A. Jonsson, *Chromatographic Theory and Basic Principles*, 1987; R. M. Smith, *Gas and Liquid Chromatography in Analytical Chemistry*, 1988; E. Katz, *Quantitative Analysis Using Chromatographic Techniques*, 1987; and J. C. Giddings, *Unified Separation Science*, 1991. In general, chromatography is typically divided into five broad categories based on the mechanism of interaction between solute analytes and the stationary phase of the chromatographic field: adsorption chromatography; partition chromatography; ion-exchange chromatography; molecular exclusion chromatography; and affinity chromatography.

Adsorption chromatography is generally regarded as the oldest form of chromatography and makes use of a solid stationary phase with a liquid or gaseous mobile phase. Solutes are usually adsorbed onto the surface of stationary phase particles, while equilibration between the stationary phase and the mobile phase accounts for separation of solute analytes.

Partition chromatography involves a liquid stationary phase formed on a thin film on the surface of a solid support. Solute equilibrates between the stationary liquid and the mobile phase. In adsorption and partition chromatography, a substantially continuous equilibration of solute between the mobile and stationary phases occurs. Columns may be packed with stationary phase or may be open tubular with stationary phase coated on the inner walls.

Ion-exchange chromatography utilizes anions (i.e., $SO_3^-$) or cations (i.e., $N(CH_3)_3^+$) that are covalently attached to the solid stationary phase (i.e., usually a resin) and the mobile phase is typically a liquid. Analyte solute ions of opposite charge are attracted to the stationary phase by coulombic forces.

Molecular exclusion chromatography (e.g., gel filtration-or-gel permeation chromatography) separates molecules by size, with larger analyte solutes passing through the chromatographic field more quickly than smaller ones. Unlike other forms of chromatography, there is generally no attractive interaction between the stationary phase and the analyte solute; rather, the liquid or gaseous mobile phase passes through a porous gel. The pores are generally small enough to exclude larger molecules, but not smaller ones. Smaller molecules usually take longer to pass through the column because they enter the gel pores and therefore must flow through a larger volume before leaving the column. In molecular exclusion chromatography, the fraction of stationary-phase volume available to solute generally decreases as the size of the solute molecules increase.

Affinity chromatography is generally believed to be the most selective type of chromatography—employing specific interactions between one kind of analyte molecule and a second covalently attached (e.g., immobilized) to the stationary phase. Affinity chromatography generally relies on chemically specific, non-covalent interactions between the stationary phase and at least one analyte solute in a heterogeneous sample.

The speed of the mobile phase passing through a chromatographic field is expressed either as a volume flow rate or as a linear flow rate. Consider, for example, a liquid chromatography experiment in which the column has an inner diameter of 0.60 cm (radius r=0.30 cm) and the mobile phase occupies 20% of the column volume. Each centimeter of column length l has a volume corresponding to $\pi r^2 l$; here 0.283 mL, of which 20% (e.g., 0.0565 mL) accounts for the mobile phase (e.g., the solvent system). The volume flow rate $$\left(\text{i.e., } \frac{\text{mL}}{\text{min}}\right)$$

expresses how much volume of solvent per unit time travels through the chromatographic field. The linear flow rate $$\left(\text{i.e., } \frac{\text{cm}}{\text{min}}\right)$$

tells how many unit distances of column length are traveled per unit time by the solvent system. In the instant example, because 1 cm of column length contains 0.0565 mL of mobile phase, 0.3 mL would occupy $$\frac{0.3 \text{ mL}}{0.0565 \frac{\text{mL}}{\text{cm}}} = 5.3 \text{ cm}$$

of column length. Accordingly, the linear flow rate corresponding to $$0.3 \frac{\text{mL}}{\text{min}}$$

is $$5.3 \frac{\text{cm}}{\text{min}}.$$

Analytes eluting from a chromatographic field may be observed with a variety of detectors, such as, for example: thermal conductivity detectors; flame ionization detectors; electron capture detectors; flame photometric detectors; alkali flame detectors; sulfur chemiluminescence detectors; atomic emission detectors and the like. The trace of the detector response as a function of elution time is known as a chromatogram. The retention time $t_r$ for each component is the time needed after injection of the sample onto the chromatographic field until the corresponding analyte is detected. Unretained mobile phase travels through the column in a minimum time $t_m$. The adjusted retention time $t'_r$ for a solute is the additional time required for analyte to travel the linear transport distance of the chromatographic field, beyond the time required by unretained solvent in accordance with $t'_r = t_r - t_m$.

The relative retention of two components is given as a quotient of the corresponding adjusted retention times. The capacity factor for a single component is the adjusted retention time divided by the elution time for the solvent. Capacity factor generally describes the ratio of time spent by solute in the stationary phase to time spent in the mobile phase. When scaling up from a small sample load to a large load, the cross-sectional area of the column is typically increased in proportion to the sample load while column length and linear flow rate are generally held constant.

For any two components 1 and 2, the relative retention $\alpha$ is defined as $$\alpha = \frac{t'_{r2}}{t'_{r1}}$$

where $t'_{r2} > t'_{r1}$, corresponding to $\alpha > 1$. The greater the relative retention, the greater the separation between the analyte components. Relative retention is generally independent of flow rate and can therefore be used to help identify peaks when the flow rate changes. For each peak in a chromatogram, the capacity factor k' is given as $$k' = \frac{t_r - t_m}{t_m};$$

which is to say that the capacity factor is the ratio of the time the solute spends in the stationary phase relative to the time the solute spends in the mobile phase. Accordingly, the longer a component is retained by the chromatographic field, the greater the capacity factor. This gives rise to the partition coefficient $$K = \frac{C_s}{C_m}$$

which corresponds to the ratio of solute concentration in the stationary phase $C_s$ relative to the concentration in the mobile phase $C_m$. Accordingly, the greater the ratio of partition coefficients between mobile and stationary phases, the greater the separation between two components of a mixture.

Given a chromatographic field of infinite permeability and cross-sectional area A that extends from x to x+l (where l represents the linear transport distance of the flow-path), the volume of the chromatographic field may be expressed as V=Al. Let the concentration at point x of analyte solute component G be [G] at time t. Accordingly, the number of particles that enter the chromatographic field per unit time is JA where J is the solute particle flux. Therefore, the rate of increase in molar concentration inside the chromatographic field due to the incoming particle flux is $$\left.\frac{\partial [G]}{\partial t}\right|_x = \frac{JA}{Al} = \frac{J}{l}.$$

Consider also an out-bound flux of solute particles at the x+l surface of the chromatographic field which may be similarly derived as $$\left.\frac{\partial [G]}{\partial t}\right|_{x+l} = \frac{J'A}{Al} = \frac{J'}{l}.$$

Therefore, the net time-rated change of concentration (e.g., the 'concentration velocity') may be expressed as:

$$\frac{d[G]}{dt} = \frac{J - J'}{l}$$

Suppose: (1) that the flux of solute particles J diffusing inside the chromatographic field comprises motion in response to a thermodynamic force F arising from a concentration gradient; (2) that the analyte particles reach a steady-state drift speed s when the thermodynamic force F is matched by the viscous drag; (3) that the drift speed s is proportional to the thermodynamic force F; (4) that the solute particle flux J is proportional to the drift speed; and (5) that the thermodynamic force F is proportional to the spatial concentration gradient $$\frac{d[G]}{dx}.$$

The resulting chain of proportionalities $J \propto s$, $s \propto F$, and $$F \propto \frac{d[G]}{dx}$$

implies that the solute particle flux J is proportional to the concentration gradient $$\frac{d[G]}{dx},$$

which will be apparent to skilled artisans as corresponding to 'Fick's First Law of Diffusion'. The constant of proportionality is given as the diffusion coefficient D in the equation $$J = D\frac{d[G]}{dx}$$

for diffusion restricted to a single dimension x. Therefore, the expression J−J' taken from the expression for the diffusive concentration velocity becomes $$D\frac{d[G]'}{dx} - D\frac{d[G]}{dx}.$$

Substitution of the linear accumulation of solute particle concentration over the length of the chromatographic field yields $$J - J' = D\frac{d}{dx}\left([G] + \frac{d[G]}{dx}l\right) - D\frac{d[G]}{dx}$$

which further reduces to $$J - J' = Dl\frac{d^2[G]}{dx^2}.$$

This expression may then be substituted back into the concentration velocity expression to give:

$$\frac{d[G]}{dt} = \frac{J - J'}{l} = D\frac{d^2[G]}{dx^2} = D\nabla_x^2[G]$$

which will be apparent to skilled artisans as the time dependent diffusion equation according to 'Fick's Second Law of Diffusion' and relates the concentration velocity at any point to the spatial variation of the concentration at that point. More generally, this may be appreciated as a physical basis for the typically observed behavior of diffusing chemical species translating away from areas of relative high concentration to areas of relative lower concentration (e.g., "moving down the concentration gradient").

Next, consider the time dependence of the partial molecular pressure p of an eluting component G from a chromatographic field of given volume V. The 'Ideal Gas Law' PV=nRT, which for molecular-scale systems rather than for large aggregates of particles (i.e., moles of molecules), becomes pV=nkT wherein: p is the partial molecular pressure; V is the volume of the container providing spatial boundary conditions; n is the number of particles; k is the Boltzmann constant; and T is the temperature. Solving for the partial pressure yields $$p = \frac{nkT}{V}.$$

After taking the partial derivative with respect to time at constant temperature and volume, the following expression for the pressure velocity may be obtained:

$$\left.\frac{\partial p}{\partial t}\right)_{T,V} = \frac{\partial\left(\frac{nkT}{V}\right)}{\partial t} = \frac{kT}{V}\frac{\partial n}{\partial t}$$

For an eluting analyte solute that is not replenished over time as the solute escapes, the time-rated change of the number of solute particles is given as $$\frac{\partial n}{\partial t} = -Z_w A_o,$$

where $Z_w$ is the collisional frequency associated with the mean free path of the solute particles and $A_o$ is the area of the opening that the solute particles have available for elution from the chromatographic field. The collisional frequency is related to the partial pressure of the solute particles p, the mass of the particles m and the temperature of the system T by the equation $$Z_w = \frac{p}{\sqrt{2\pi mkT}}.$$

Substitution of this relation back into the expression for the pressure velocity yields $$\frac{\partial p}{\partial t} = \frac{-pA_0}{V}\sqrt{\frac{kT}{2\pi m}}$$

which integrates over time to $$p = p_0 e^{\frac{-t}{\tau}},$$

where $$\tau = \frac{V}{A_0}\sqrt{\frac{2\pi m}{kt}}.$$

From this expression for the pressure velocity, the following may generally be observed: (1) if the eluent (e.g., solvent and sample) is not replenished, the pressure decreases exponentially to zero; (2) the pressure velocity is faster with increasing temperature and slower with decreasing temperature; (3) the pressure velocity is slower with heavier solute particles and faster with less massive particles; (4) the pressure velocity is faster with increasing surface area of the chromatographic field and slower with decreased surface area; and (5) the pressure velocity is slower with increasing volume of the chromatographic field and faster with decreasing volume.

At constant temperature, the time derivative of the expression for the partial pressure $$p = \frac{nkT}{V}$$

becomes:

$$\left.\frac{\partial p}{\partial t}\right)_T = kT\frac{\partial\left(\frac{n}{V}\right)}{\partial t} = kT\frac{\partial[G]}{\partial t}$$

Therefore, substituting the expression corresponding to Fick's Second Law of Diffusion for the concentration velocity previously derived, the generalized expression for the pressure velocity of solute particles diffusing in three dimensions in a chromatographic field of infinite permeability as a function of concentration of the solute particles [G] may be represented as:

$$\left.\frac{dp}{dt}\right)_T = -kTD_G\nabla^2[G] = -kTD_G\left(\frac{\partial^2}{\partial x^2} + \frac{\partial^2}{\partial y^2} + \frac{\partial^2}{\partial z^2}\right)[G]$$

If, however, the chromatographic field is assumed to have finite diffusive permeability (indeed, as generally required for achieving chromatographic separation), an additional diffusion coefficient $\hat{D}_{\Xi(a,b,c)}$ may be included to account for various permeability metrics such as, for example: the number of chromatographic theoretical plates, chromatographic plate height, stationary phase adsorption, non-uniform porosity; anisotropic transport along different dimensions; hydrophobicity; capillary defects; etc.

For example, consider the expression for a carbon nanotube component B diffusing through a chromatographic field (or otherwise porous barrier)Ξ:

$$\left.\frac{dp}{dt}\right)_{\Xi,B}^{diffusion} = -kT(\hat{D}_{\Xi(a,b,c)}D_B)\left(\frac{\partial^2}{\partial x^2} + \frac{\partial^2}{\partial y^2} + \frac{\partial^2}{\partial z^2}\right)[B]$$

Upon inspection, this expression relates the concentration of the CNT component B at any point within the chromatographic field (or otherwise porous barrier)Ξ to the three dimensional variation of CNT component B concentration at that point; which is to say that B will passively diffuse through a chromatographic field so as to move down its concentration gradient from volume elements comprising higher B concentration to volume elements comprising relative lower B concentration.

Substitution of $A_\Xi l$ for the volume V in the effusion equation $$\frac{dp}{dt} = \frac{-pA_0}{V}\sqrt{\frac{kT}{2\pi m}}$$

yields $$\frac{dp}{dt} = \frac{-pA_0}{A_\Xi l}\sqrt{\frac{kT}{2\pi m}}.$$

If the ratio of the area of the aggregate void-volume to the aggregate surface area of the chromatographic field is taken to be a dimensionless quantity θ corresponding to the porosity of the chromatographic field, a composite expression for elution of CNT component B becomes:

$$\left.\frac{dp}{dt}\right)_{\Xi,B}^{elution} = -p_B\theta_\Xi\sqrt{\frac{kT}{2\pi m_B l_\Xi^2}}$$

and relates the pressure of B that elutes through the chromatographic field (or otherwise porous barrier)Ξ to: the back-side pressure of the CNT component $p_B$; the temperature T; the mass of the CNT component $m_B$; the linear transport distance of the chromatographic field l; and the porosity of the chromatographic field $\theta_\Xi$. Accordingly, the CNT analyte solute B will generally: (1) elute more rapidly at higher operating temperatures and more slowly at lower temperatures; (2) elute more rapidly with increased back-side pressure of B and more slowly with decreased back-side pressure; (3) elute more rapidly with chromatographic fields having increased porosity and more slowly with decreased porosity; and (4) elute more rapidly with porous chromatographic fields having decreased linear transport distances (e.g., shorter columns) and more slowly with increased transport distances.

Plate height $$H = \frac{\sigma^2}{x},$$

where σ is the standard deviation and x is the linear transport distance along the flow-path, is a measure of how well chromatographic bands of analyte solute may be separated on a particular chromatographic field. The number of plates for a Gaussian peak is generally given as $$N = 16\frac{t_r^2}{w^2},$$

where $t_r$ is the retention time and w is the peak width (typically taken as four standard deviations at the baseline; e.g., 4σ). Resolution of neighboring peaks becomes the difference in retention time divided by the average width w measured at the baseline. Resolution is proportional to $\sqrt{N}$ and also generally increases with relative retention and capacity factor. Accordingly, doubling the length of a chromatographic field generally increases resolution by a factor of approximately $\sqrt{2}$.

The standard deviation of a diffusing band of solute generally corresponds to $\sigma = \sqrt{2Dt}$, where D is the composite diffusion coefficient and t is time. The van Deemter equation describes band broadening on a chromatographic field as:

$$H \approx A + \frac{B}{u_x} + Cu_x$$

where H is the plate height, $u_x$ is the linear flow rate along the linear transport path of the chromatographic field, and A, B and C are constants: A representing irregular flow paths, B representing longitudinal diffusion and C representing the finite rate of transfer of analyte solute between mobile and stationary phases for a given column. The optimum flow rate, which generally minimizes plate height, is faster for gas chromatography than for liquid chromatography. The number of plates and the optimal flow rate usually increases as the stationary-phase particle size is decreased. Open tubular columns typically provide higher resolution and shorter analysis times than packed columns. In general, bands spread not only on the chromatographic field but also during sample injection as well as during component analyte detection. Overloading and tailing may be corrected by inter alia using smaller samples or by masking strong adsorption sites on the stationary phase. Additionally, there are several underlying processes that may impact the plate height, such as, for example: longitudinal diffusion; resistance to mass transfer in the mobile and/or stationary phase; and eddy diffusion.

To monitor the performance of a particular column, it is usually a recommended practice to periodically measure the capacity factor of a standard sample, the number of theoretical plates and/or peak asymmetry. Variations in any of these values generally indicate degradation of the chromatographic field over time and/or repeated use.

Non-oxidative Cleaning of Carbon Nanotubes

Various methods for the production of carbon nanotubes (CNT's) are known in the art, such as, for example: laser ablation; carbon arc deposition; chemical vapor deposition (CVD) and the like. These techniques typically result in varying amounts of contaminants such as, for example, amorphous carbon and catalysts in the crude reaction product. Conventional methods generally involve exposure of the reaction product mixture to a strong oxidizing agent in order to effect subsequent removal of amorphous carbon followed by an acidic wash to remove metal catalysts. These procedures generally do not remove all of the contaminants present in the raw product material and may, in fact, cause damage to, for example, the sidewalls of CNT's.

In a representative aspect, in accordance with one exemplary embodiment of the present invention, as depicted for example in the figure, a substantially non-chemically-reactive method by which amorphous carbon present in a nanomorphic carbon sample may be effectively partitioned is described. An exemplary process for the cleaning of CNT's, for example, comprises: providing a crude or otherwise pre-processed nanomorphic CNT sample (step 100); suspending the CNT sample in polar-protic (i.e., aqueous) solvent (step 110); adding nanoparticles to the sample suspension (step 115); sonicating the sample mixture (step 120); centrifugating the sample at about 20,000 RCF (e.g., Relative Centrifugal Force; a.k.a., "g-force") for about 30 minutes (step 125); and decanting off the supernatant (step 130).

In one exemplary and representative embodiment, CNT's may be dissolved to an approximate concentration of 0.1 mg/mL in an aqueous suspension of a substantially uncharged surfactant (i.e., TRITON X-100®;a.k.a., octylphenol ethylene oxide condensate, octoxynol-9; commercially available from Sigma Aldrich, Milwaukee, Wis., USA; CAS Registry No. 9002-93-1) typically 1% (w/w) relative to water, with about a 400% excess by weight of positively charged nanoparticles generally having dimensions on the order of up to about 300 nm. In one embodiment, nanoparticles 115 may comprise, for example, amidine latex. Contaminate amorphous carbon species are generally observed to adsorb to the nanoparticles, which are subsequently gravimetrically precipitated out leaving at least partially purified CNT's behind in the solvent suspension. The procedure may be repeated until no further precipitation occurs after centrifugation (typically, as much as 3–4 times). Alternatively, conjunctively or sequentially, the supernatant may be spectroscopically analyzed inter alia to more precisely determine relative concentrations of contaminants and/or nanomorphic carbon species in order to determine an end-point for a repeated purification procedure.

The disclosed cleaning procedure has been observed to be highly effective as evidenced by, for example, transmission electron microscopy, atomic force microscopy, infrared spectroscopy and thermogravimetric analysis. Various other spectroscopies and/or microscopies may be alternatively, conjunctively or sequentially employed to determine or otherwise characterize the relative post-procedure ratio of contaminate to nanomorphic carbon species concentration. The resulting at least partially purified nanomorphic carbon sample may thereafter be further separated via any chromatographic method herein described, now known or hereafter derived in the art.

In the foregoing specification, the invention has been illustrated with reference to specific exemplary embodiments; however, it will be appreciated that various modifications and changes may be made without departing from the scope of the present invention as set forth in the claims below. The specification is to be regarded in an representative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order to produce substantially the same result as the present invention and are accordingly not limited to the specific configuration recited in the claims.

Benefits, other advantages and solutions to problems have been described above with regard to a particular embodiment; however, any benefit, advantage, solution to problems or any element that may cause any particular benefit, advantage or solution to occur or to become more pronounced are not to be construed as critical, required or essential features or components of any or all the claims. As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

The invention claimed is:

1. A substantially non-reactive method for cleaning carbon nanotubes, comprising the steps of:
    adding a suspension of positively charged nanoparticles to an aqueous suspension of carbon nanotubes having impurities thereon;
    sonicating the resulting mixed suspension of charged nanoparticles and carbon nanotubes;
    centrifugating the mixed suspension of charged nanoparticles and carbon nanotubes; and
    at least partially decanting off the resulting supernatant of carbon nanotubes.

2. The method for cleaning carbon nanotubes of claim 1, wherein said aqueous suspension comprises water.

3. The method for cleaning carbon nanotubes of claim 1, wherein the centrifugating step comprises centrifugating for up to 30 minutes.

4. The method for cleaning carbon nanotubes of claim 3, further comprising the step of repeating at least one of the steps of sonicating, centrifugating and decanting and further comprising the step of determining when to terminate said repeating of at least one of said steps of sonicating, centrifugating and decanting by monitoring the precipitation of said nanoparticles.

5. The method for cleaning carbon nanotubes of claim 3, wherein the centrifugating step comprises centrifugating at up to about 20,000 relative centrifugal force.

6. The method for cleaning carbon nanotubes of claim 5, further comprising the step of repeating at least one of the steps of sonicating, centrifugating and decanting and further comprising the step of determining when to terminate said repeating of at least one of said steps of sonicating, centrifugating and decanting by monitoring the precipitation of said nanoparticles.

7. The method for cleaning carbon nanotubes of claim 1, further comprising the step of repeating at least one of the steps of sonicating, centrifugating and decanting and further comprising the step of determining when to terminate said repeating of at least one of said steps of sonicating, centrifugating and decanting by monitoring the precipitation of said nanoparticles.

8. The method of cleaning carbon nanotubes of claim 1, wherein said nanoparticles comprise dimensions of less than 300 nm.

9. The method of cleaning carbon nanotubes of claim 1, further comprising the step of determining the effectiveness of the cleaning procedure.

10. The method of cleaning carbon nanotubes of claim 9, wherein said step of determining the effectiveness of the cleaning procedure comprises at least one of analytical microscopy and analytical spectroscopy.

11. The method of cleaning carbon nanotubes of claim 10, wherein said analytical microscopy comprises at least one of transmission electron microscopy, atomic force microscopy and scanning electron microscopy.

12. The method of cleaning carbon nanotubes of claim 10, wherein said analytical spectroscopy comprises at least one of ultraviolet spectroscopy, infrared spectroscopy, nuclear magnetic resonance spectroscopy, Raman spectroscopy, fluorescence spectroscopy and mass spectroscopy.

13. The method of cleaning carbon nanotubes of claim 1, further comprising the step of chromatographic sample separation.

14. The method of cleaning carbon nanotubes of claim 13, wherein said step of chromatographic separation is at least one of column chromatography and size-exclusion chromatography.

15. A substantially non-chemically-reactive method for cleaning carbon nanotubes, comprising the steps of:

sonicating a carbon nanotube sample in an aqueous suspension of positively charged amidine latex nanoparticles;

centrifugating said sample at up to about 20,000 relative centrifugal force for about 30 minutes; and at least partially decanting off the supernatant.

16. The method for cleaning carbon nanotubes of claim 15, further comprising the step of repeating at least one of said steps of sonicating, centrifugating and decanting.

17. The method for cleaning carbon nanotubes of claim 16, further comprising the step of determining when to terminate said repeating of at least one of said steps of sonicating, centrifugating and decanting by monitoring the concentration of contaminants.

18. The method for cleaning carbon nanotubes of claim 15, wherein said positively charged nanoparticles comprise dimensions of less than 300 nm.

19. The method for cleaning carbon nanotubes of claim 15, further comprising the step of chromatographic separation.

* * * * *